(12) United States Patent
Ong

(10) Patent No.: US 7,564,522 B2
(45) Date of Patent: Jul. 21, 2009

(54) FULL SYMMETRICAL WIDE-VIEWING ANGLE DISPLAY

(75) Inventor: Hiap L. Ong, Northborough, MA (US)

(73) Assignee: Kopin Corporation, Taunton, MA (US)

( * ) Notice: Subject to any disclaimer, the term of this patent is extended or adjusted under 35 U.S.C. 154(b) by 347 days.

(21) Appl. No.: 11/136,331

(22) Filed: May 23, 2005

(65) Prior Publication Data

US 2005/0270457 A1    Dec. 8, 2005

Related U.S. Application Data

(60) Provisional application No. 60/573,137, filed on May 21, 2004.

(51) Int. Cl.
  *G02F 1/1335* (2006.01)
(52) U.S. Cl. .................. 349/117; 349/119
(58) Field of Classification Search .............. 349/117, 349/119
  See application file for complete search history.

(56) References Cited

U.S. PATENT DOCUMENTS

| | | |
|---|---|---|
| 5,249,070 A | 9/1993 | Takano |
| 5,309,264 A | 5/1994 | Lien et al. |
| 5,398,127 A | 3/1995 | Kubota et al. |
| 5,504,604 A | 4/1996 | Takatori et al. |
| 5,550,661 A | 8/1996 | Clark et al. |
| 5,576,854 A | 11/1996 | Schmidt et al. |
| 5,576,862 A | 11/1996 | Sugiyama et al. |
| 5,610,743 A | 3/1997 | Tsai |
| 5,623,354 A | 4/1997 | Lien et al. |
| 5,682,217 A | 10/1997 | Hisatake et al. |
| 5,710,611 A | 1/1998 | Suzuki et al. |
| 5,726,721 A | 3/1998 | Sumiyoshi et al. |
| 5,726,723 A | 3/1998 | Wang et al. |
| 5,818,560 A | 10/1998 | Kouno et al. |
| 5,838,407 A | 11/1998 | Chigrinov et al. |
| 5,864,376 A | 1/1999 | Takatori |
| 5,907,380 A | 5/1999 | Lien |

(Continued)

FOREIGN PATENT DOCUMENTS

JP    11212107    8/1999

(Continued)

OTHER PUBLICATIONS

Ong, H.L., et al., "New Multi-Domain Vertical Alignment LCD with High Contrast Ratio and Symmetrical Wide Viewing Angle Performance and Simplest Fabrication Design and Process", *SID '03 Digest*, p. 119, 680-683 (2003).

(Continued)

*Primary Examiner*—David Nelms
*Assistant Examiner*—David Y Chung
(74) *Attorney, Agent, or Firm*—Hamilton, Brook, Smith & Reynolds, P.C.

(57) ABSTRACT

A microdisplay including a light-transmissive active circuit layer, the active circuit layer having an optical birefringence value that contributes to an asymmetrical viewing space and an optical compensator to compensate for the optical birefringence value of the active circuit layer. The optical compensator can include a retardation film, a c-plate, and/or a passive circuit layer. The passive circuit layer can be fabricated to equivalent specifications of the active circuit layer.

25 Claims, 4 Drawing Sheets

U.S. PATENT DOCUMENTS

| | | |
|---|---|---|
| 5,926,161 A | 7/1999 | Furuhashi et al. |
| 5,953,091 A | 9/1999 | Jones et al. |
| 6,057,902 A | 5/2000 | Angelopoulos et al. |
| 6,061,115 A | 5/2000 | Samant et al. |
| 6,097,464 A | 8/2000 | Liu |
| 6,124,907 A | 9/2000 | Jones et al. |
| 6,141,074 A | 10/2000 | Bos et al. |
| 6,157,427 A | 12/2000 | Saynor et al. |
| 6,233,030 B1 | 5/2001 | Oh-Ide et al. |
| 6,256,080 B1 | 7/2001 | Colgan et al. |
| 6,281,953 B1 | 8/2001 | Lee et al. |
| 6,285,428 B1 | 9/2001 | Kim et al. |
| 6,285,431 B2 | 9/2001 | Lyu et al. |
| 6,313,896 B1 | 11/2001 | Samant et al. |
| 6,317,183 B2 | 11/2001 | Komatsu |
| 6,323,927 B1 | 11/2001 | Hiroshi |
| 6,327,010 B1 | 12/2001 | Scheuble et al. |
| 6,335,776 B1 | 1/2002 | Kim et al. |
| 6,356,335 B1 | 3/2002 | Kim et al. |
| 6,400,440 B1 | 6/2002 | Colgan et al. |
| 6,417,899 B1 | 7/2002 | Jones et al. |
| 6,426,786 B1 | 7/2002 | Lu et al. |
| 6,449,025 B2 | 9/2002 | Lee |
| 6,462,798 B1 | 10/2002 | Kim et al. |
| 6,466,288 B1 | 10/2002 | Rho |
| 7,286,199 B2 * | 10/2007 | Moriya ........................ 349/117 |
| 2001/0043301 A1 | 11/2001 | Liu |
| 2002/0021396 A1 | 2/2002 | Yoo et al. |
| 2002/0039166 A1 | 4/2002 | Song |
| 2002/0047971 A1 | 4/2002 | Kwon et al. |
| 2002/0067454 A1 | 6/2002 | Hong et al. |
| 2002/0080320 A1 | 6/2002 | Suzuki et al. |
| 2003/0025865 A1 | 2/2003 | Takatori et al. |
| 2003/0071952 A1 | 4/2003 | Yoshida et al. |
| 2003/0174269 A1 | 9/2003 | Tanaka et al. |

FOREIGN PATENT DOCUMENTS

| | | |
|---|---|---|
| JP | 11311785 | 11/1999 |
| JP | 2003 167246 A | 6/2003 |

OTHER PUBLICATIONS

Ong, H. L., "Broken and Preservation of Symmetrical Viewing Angle in Film-Compensated LCDs," *SID '99 Digest*, p. 51, pp. 673-676 (1999).

* cited by examiner

FULL SYMMETRICAL WIDE-VIEWING ANGLE DISPLAY

RELATED APPLICATION

This application claims the benefit of U.S. Provisional Application No. 60/573,137, filed on May 21, 2004, the entire teachings of which are herein incorporated by reference.

BACKGROUND

Liquid crystal displays (LCDs) and liquid crystal microdisplays are growing at an increasingly rapid rate, particularly in projection, digital still camera, and camcorder electronic viewfinder applications. The pixel size is very small and decreasing, ranging from about 3 μm to 50 μm (or less) in pitch. The use of integrated circuit (IC) processing using single crystal silicon and poly-silicon processing are the two most common methods for thin-film transistor (TFT) fabrication.

SUMMARY

The TFT fabrication processes for small pixel geometries can induce optical birefringence effects that in turn change the viewing angle of the LCDs from symmetrical to asymmetrical. The process-induced optical birefringence on the TFT wafer has been experimentally observed with small pixels in very high-resolution geometries. The induced TFT optical birefringence has a large impact on the resulting display viewing angle. That is, the TFT optical birefringence produces an asymmetrical viewing angle. There is provided a display and method for compensating an asymmetrical viewing space of a microdisplay having an active circuit layer with an optical birefringence value that contributes to the asymmetrical viewing space.

A microdisplay can include a light-transmissive active circuit layer, the active circuit layer having an optical birefringence value that contributes to an asymmetrical viewing space and an optical compensator to compensate for the optical birefringence value of the active circuit layer. In particular embodiments, the optical birefringence value can be less than 0.03 μm. The optical compensator can include a retardation film, a c-plate, and/or a passive circuit layer. The passive circuit layer can be fabricated to equivalent specifications of the active circuit layer. The microdisplay can further include a layer of twisted-neumatic liquid crystal material.

The optical compensator can be disposed in close proximity to an outer surface of the active circuit layer. The optical compensator can be integrated with a wide viewing angle film.

The active circuit layer can include a CMOS circuit. The CMOS circuit can include a plurality of thin-film-transistors. The active circuit layer can include an array of pixel electrodes, having a pixel dimension of less than about 50 microns.

A method can compensate an asymmetrical viewing space of a microdisplay having an active circuit layer with an optical birefringence value that contributes to the asymmetrical viewing space by adding an optical compensator to compensate for the optical birefringence value of the active circuit layer. The optical compensator can be a retardation film, a c-plate, and/or a passive circuit layer. The optical compensator can be disposed in close proximity to an outer surface of the active circuit layer and/or can be integrated with a wide viewing angle film.

BRIEF DESCRIPTION OF THE DRAWINGS

The features and advantages of the invention will be apparent from the following more particular description of particular embodiments, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
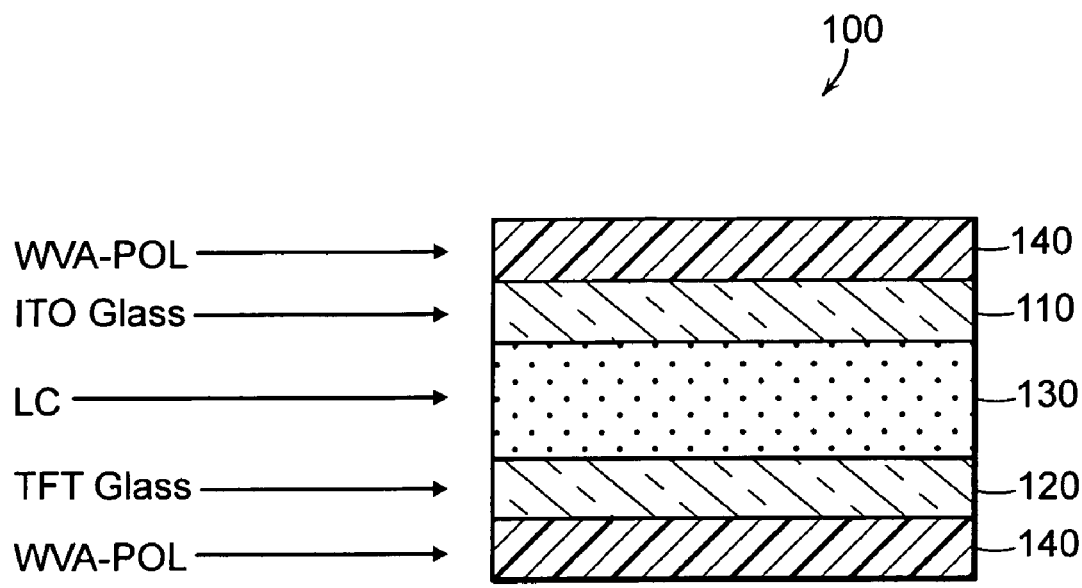
FIG. 1 shows a cross-sectional view of a typical microdisplay using wide-viewing angle (WVA) polarizers.

FIG. 1 shows a cross-sectional view of one type of a typical microdisplay 100. The typical microdisplay 100 is less than 1 inch in diagonal and includes two parallel substrates 110, 120, and a liquid crystal (LC) layer 130 formed in the space between the two parallel substrates 110, 120. In one embodiment, one substrate 110 may be an ITO substrate or a color filter substrate and the other substrate 120 may be an active circuit layer, such as a thin film transistor (TFT) array substrate. The LC layer can be twisted-neumatic liquid crystal material. A wide-viewing angle-polarizer (WVA-POL) 140 can be used to increase the viewing angle of the microdisplay 100 and to compensating for the liquid crystal layer 130 birefringence. In one particular embodiment, the WVA portion of the WVA-POL 140 is a WV-SA film made by Fuji Film. It should be understood by one skilled in the art that the WVA-POL 140 can be separate components or be made as one component. Methods of using compensation films for compensating birefringence for the liquid crystal layer 130 are shown in "Preservation of Symmetrical Viewing Angle in Film Compensated LCDs," by Ong, SID'99, p. 673, 1999, the entire teachings of which are herein incorporated by reference.

The TFT substrate 120 can include an array of pixel electrodes having a pixel dimension of less than about 50 microns, such as 30 μm down to about 3 μm. The TFT substrate 120 is a light-transmissive active circuit layer which includes an optical birefringence value that contributes to an asymmetrical viewing space of the microdisplay 100. The particular optical birefringence value is small, such as less than 0.03 μm. The source of the optical birefringence was identified in the display materials using a crossed polarizer and normally incident light. Beside the LC material, the TFT substrate 120 showed an optical birefringence effect. The process materials used for the TFT fabrication are not normally optical birefringence materials. However, it was determined that the TFT substrate 120 optical birefringence was induced by the CMOS process used to fabricate the TFT pixel. This is the first step in microdisplay processing. Thus, a small pixel with a periodic grating-like structure becomes optically birefringence under periodic surface micro-relief, mechanical stretching, or etching processes.

The complexity of the TFT substrate 120 is as follows:
a. the optical birefringence of the TFT substrate 100 is small (~0.05 μm);
b. the substrate is both optically birefringence and absorptive; and
c. the period of the small TFT pixel (~3-50 μm) forms a good optical grating geometry that strongly scatters light.

These three factors make measuring the optical birefringence of the TFT substrate 120 very difficult. The measurement can be simplified by eliminating the black matrix step in the TFT fabrication process. Methods described in "Cell-Gap and Twist-Angle Measurement for TN-LCDs by Light Interference, Optical Compensation, and Rotating-Polarizer Method," by Ong, SID'99, p. 787, 1994, the entire teachings of which are herein incorporated by reference, can be used for accurately measuring the optical birefringence value for the TFT substrate 120. Measured data showed the optical birefringence is about 0.02-0.05 μm, with the optical axis close to vertical alignment and a small absorption coefficient.

Figure 2A:
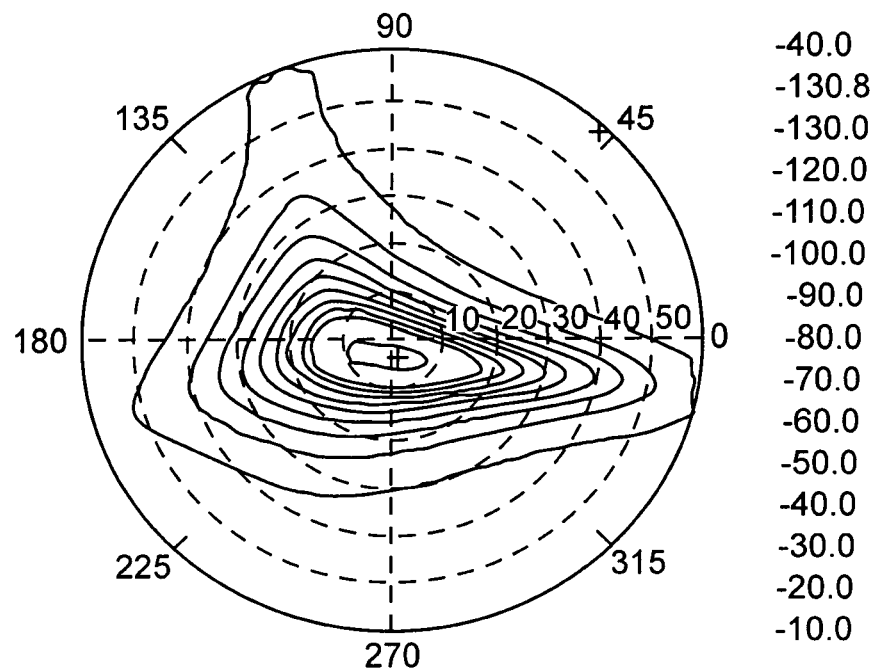
FIG. 2A shows a viewing angle contour plot for the microdisplay of FIG. 1 using 0/90 LC top/bottom alignment geometry.
Figure 2B:
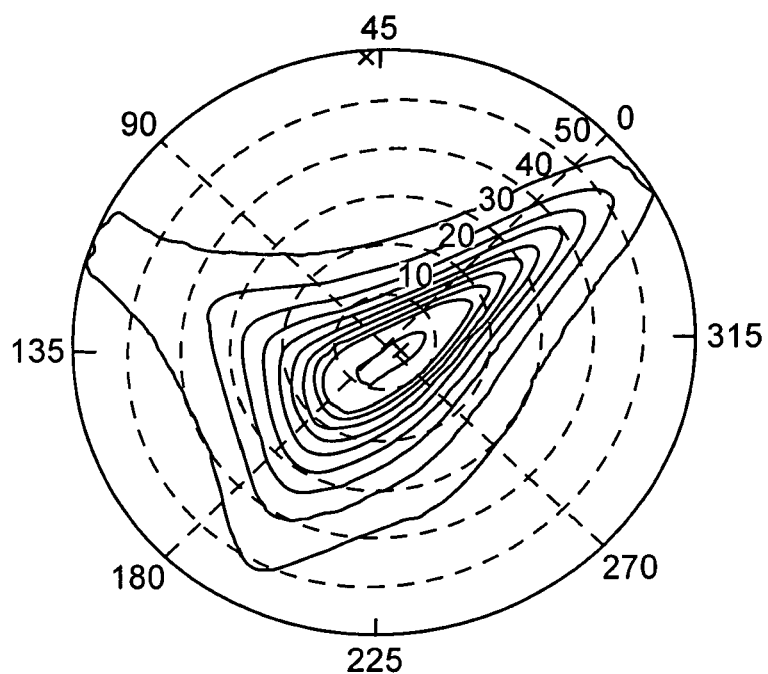
FIG. 2B shows a viewing angle contour plot for the microdisplay of FIG. 1 using 45/135 LC top/bottom alignment geometry.

FIG. 2A shows a viewing angle contour plot for the microdisplay 100 of FIG. 1 using 0/90 LC alignment geometry and FIG. 2B shows a viewing angle contour plot for the microdisplay 100 of FIG. 1 using 45/135 LC alignment geometry. As shown, the TFT substrate 120 optical birefringence caused an asymmetrical viewing angle zone for a TN Active-Matrix Liquid Crystal Display (AMLCD) using TFT substrates 120 fabricated from a complementary metal-oxide semiconductor (CMOS) process. The viewing angle in both FIGS. 2A and 2B are asymmetrical in all viewing zones.

Particular embodiments of the present invention use an optical compensator to compensate for at least a portion of the optical birefringence value of the active circuit layer, thereby improving the asymmetrical viewing angle to a more symmetrical viewing angle. The optical compensators can include a retardation film, a c-plate, and/or a passive circuit layer.

Figure 3:
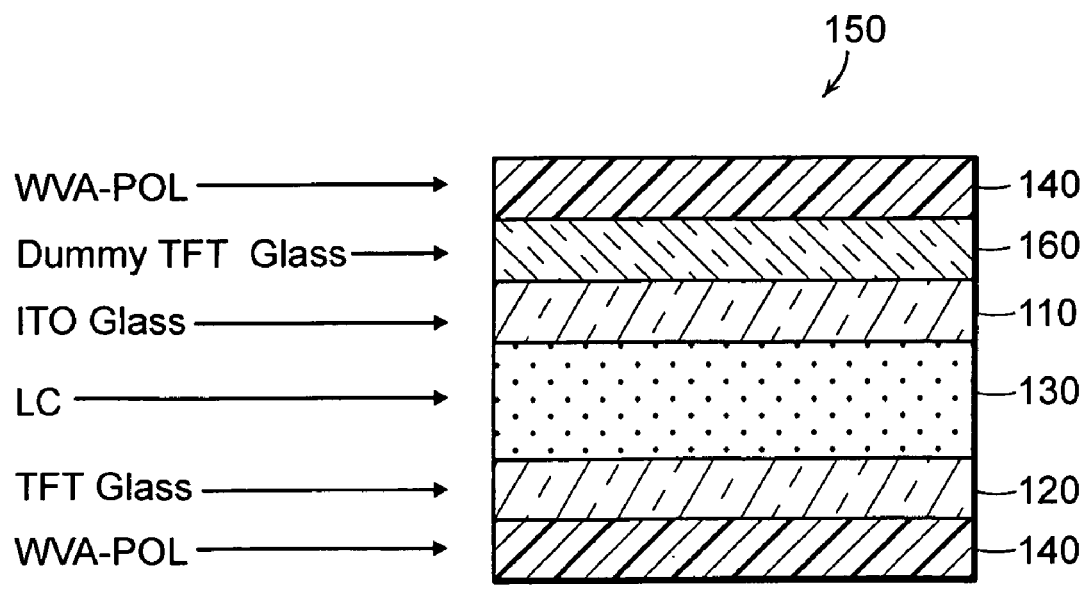
FIG. 3 shows a cross-sectional view of a microdisplay using WVA polarizers and an extra TFT substrate.

FIG. 3 shows a cross-sectional view of a microdisplay 150 using WVA-POL and a passive circuit layer (an extra (dummy) TFT substrate) 160 to compensate for the optical birefringence. The dummy TFT substrate 160 is fabricated to equivalent specifications of the TFT substrate 120 and can include a CMOS circuit having a plurality of thin-film-transistors. As shown, the dummy TFT substrate 160 is disposed opposite the TFT substrate 120. It should be known to one skilled in the art that the dummy TFT substrate 160 and WVA-POL 140 can be used in any display arrangement, such as a frameless display. As such, the TFT substrate 160 compensates for the optical birefringence associated with the TFT substrate 120 and provides a more symmetrical wide-viewing angle.

Figure 4A:
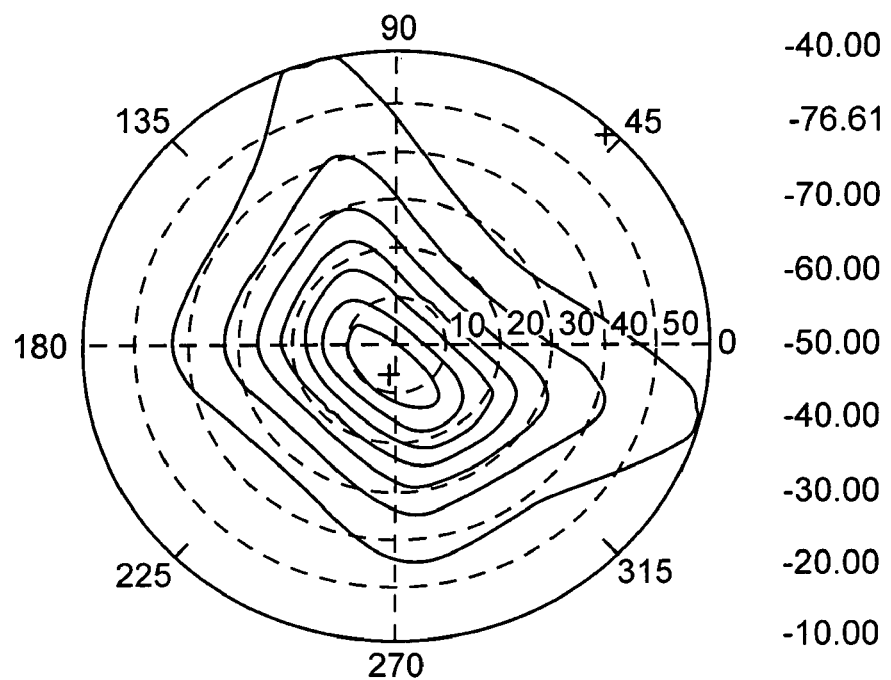
FIG. 4A shows a viewing angle contour plot for the microdisplay of FIG. 3 using 0/90 LC top/bottom alignment geometry.
Figure 4B:
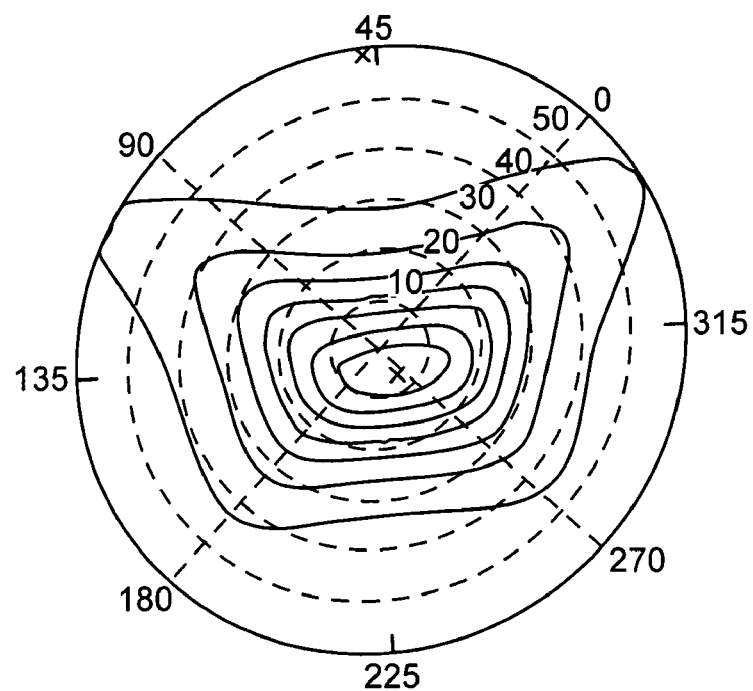
FIG. 4B shows a viewing angle contour plot for the microdisplay of FIG. 3 using 45/135 LC top/bottom alignment geometry.

FIG. 4A shows a viewing angle contour plot for the microdisplay 150 of FIG. 3 using 0/90 LC alignment geometry and FIG. 4B shows a viewing angle contour plot for the microdisplay 100 of FIG. 3 using 45/135 LC alignment geometry. As shown, an improved symmetrical wide-viewing angle was obtained. However, costs associated with this method are high because TFT substrates are expensive.

Figure 5:
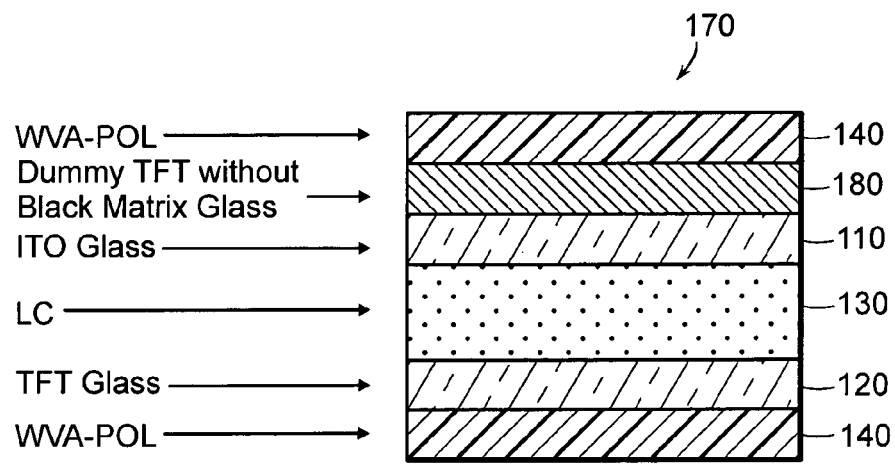
FIG. 5 shows a cross-sectional view of a microdisplay using WVA polarizers and an extra TFT substrate without a black matrix process step.

FIG. 5 shows a cross-sectional view of a microdisplay 170 using WVA-POL and an extra TFT substrate 180 without a black matrix process step. The microdisplay 170 is substantially the same as the display of FIG. 3 without black matrix material used in the dummy TFT substrate 180. As shown, the dummy TFT substrate 180 is disposed opposite the TFT substrate 120. As such, the TFT substrate 180 compensates for the optical birefringence associated with the TFT substrate 120 and provides a more symmetrical wide-viewing angle. However, costs associated with this method are also high because TFT substrates are expensive.

Figure 6:
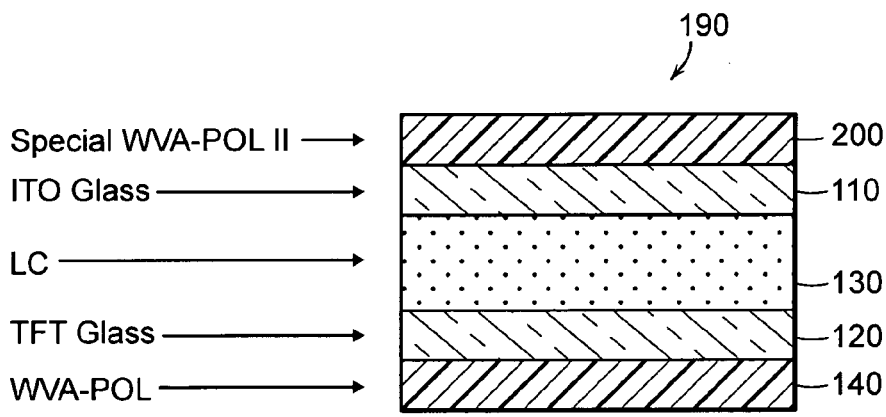
FIG. 6 shows a cross-sectional view of a microdisplay using WVA polarizers and a C-plate having positive birefringence.

FIG. 6 shows a cross-sectional view of a microdisplay 190 using WVA-POL and a C-plate having positive birefringence. As shown, a special WVA-POL 200 is disposed opposite the TFT substrate 120. The special WVA-POL 200 includes a special optical film having a positive birefringence with a vertical axis orientation, e.g. a C-plate. The optical birefringence value should be within normal manufacturing tolerances as that of the TFT substrate 120. As such, the special WVA-POL 200 compensates for the optical birefringence associated with the TFT substrate 120 and provides a more symmetrical wide-viewing angle. As with the previous embodiments, the special WVA-POL 200 can be included in one or multiple film configurations. The embodiment of FIG. 6 is preferable since the costs in relation to FIGS. 3 and 5 are reduced.

Figure 7:
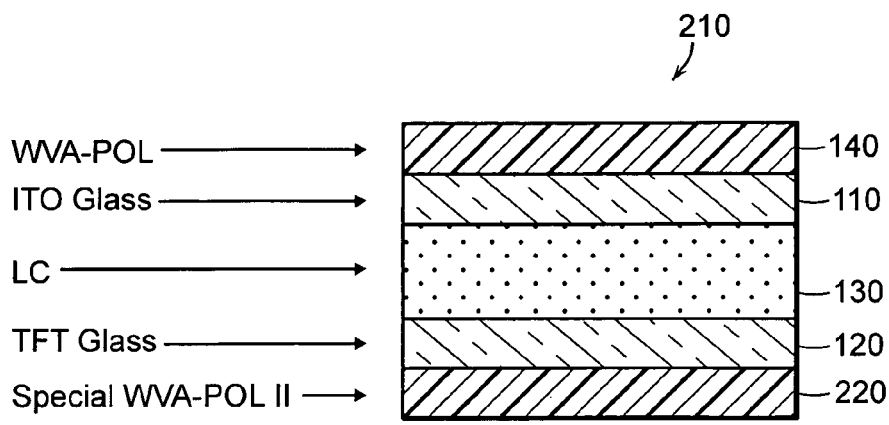
FIG. 7 shows a cross-sectional view of a microdisplay using WVA polarizers and a C-plate having negative birefringence.

FIG. 7 shows a cross-sectional view of a microdisplay 210 using WVA-POL and a C-plate having negative birefringence. As shown, a special WVA-POL 220 is disposed in close proximity to the TFT substrate 120. The special WVA-POL 220 includes a special optical film having a negative birefringence with a vertical axis orientation, e.g. a C-plate. The optical birefringence value should be within normal manufacturing tolerances as that of the TFT substrate 120. As such, the special WVA-POL 220 compensates for the optical birefringence associated with the TFT substrate 120 and provides a more symmetrical wide-viewing angle. As with the previous embodiments, the special WVA-POL 220 can be included in one or multiple film configurations. The embodiment of FIG. 6 is preferable since the costs in relation to FIGS. 3 and 5 are reduced.

It should be appreciated by one skilled in the art that multiple microdisplays are produced from a single wafer. As such, the TFT birefringence associated with each microdisplay can be slightly different depending on the location of the microdisplay on the wafer. That is, microdisplays in the center of the wafer will probably have a different birefringence value than microdisplays located the outer periphery of the wafer. Although the viewing angle of each microdisplay can be individual improved using the described methods, it should be appreciated that data can be recorded for multiple microdisplays and used in determining a compensation value to be used to improve the viewing angle of the microdisplays. As such, some microdisplays will have a more improved viewing angle than others.

It should be known by one skilled in the art that the methods and techniques described above can be used with any microdisplay having very small pixel geometry, such as single-domain titled vertical alignment displays (VA) and multi-domain vertical alignment displays (MVA). Further, multiple films may be used in any configuration to compensate the optical birefringence associated with the TFT substrate 120.

While this invention has been particularly shown and described with references to particular embodiments, it will be understood by those skilled in the art that various changes in form and details may be made without departing from the scope of the invention.

What is claimed is:

1. A microdisplay, comprising:
   a light-transmissive active circuit layer, the active circuit layer having an optical birefringence value that contributes to an asymmetrical viewing space;
   an optical compensator to compensate for at least a portion of the optical birefringence value of the active circuit layer, wherein the optical axis of the compensator is vertical with respect to the plane of the compensator, and wherein the optical compensator compensates an optical birefringence value in a range between about 0.02 µm and about 0.05 µm; and
   a layer including a liquid crystal material.

2. The microdisplay of claim 1, wherein the optical compensator includes a retardation film or a c-plate.

3. The microdisplay of claim 1, wherein the optical compensator is disposed at the same side as the active circuit layer with respect to the liquid crystal layer and has a negative birefringence value.

4. The microdisplay of claim 1, wherein the optical compensator is disposed opposite the active circuit layer with respect to the liquid crystal layer and has a positive birefringence.

5. The microdisplay of claim 4, wherein the optical compensator includes a passive circuit layer and the passive circuit layer is fabricated to equivalent specifications of the active circuit layer.

6. The microdisplay of claim 1, wherein the optical compensator is disposed in close proximity to an outer surface of the active circuit layer.

7. The microdisplay of claim 6, wherein the optical compensator is integrated with a wide viewing angle film.

8. The microdisplay of claim 1, wherein the active circuit layer includes a CMOS circuit.

9. The microdisplay of claim 8, wherein the CMOS circuit includes a plurality of thin-film-transistors.

10. The microdisplay of claim 1, wherein the active circuit layer includes an array of pixel electrodes, having a pixel dimension of less than about 50 microns.

11. The microdisplay of claim 1, wherein the liquid crystal material is selected from the group comprising twisted-nematic liquid crystal material, single-domain tilted vertical alignment liquid crystal material, and multi-domain vertical alignment liquid crystal material.

12. The microdisplay of claim 1, wherein the optical birefringence value is less than 0.03 µm.

13. A method for compensating an asymmetrical viewing space of a microdisplay having an active circuit layer with an optical birefringence value that contributes to the asymmetrical viewing space, comprising:
   adding an optical compensator to compensate for at least a portion of the optical birefringence value of the active circuit layer,
   wherein the optical axis of the compensator is vertical with respect to the plane of the compensator, and wherein the compensator compensates an optical birefringence of the active circuit layer in a range between about 0.02 µm and about 0.05 µm.

14. The method of claim 13, wherein the optical compensator is a retardation film or a c-plate.

15. The method of claim 13, wherein the optical compensator is disposed at the same side as the active circuit layer with respect to the liquid crystal layer and has a negative birefringence value.

16. The method of claim 13, wherein the optical compensator is disposed opposite the active circuit layer with respect to the liquid crystal layer and has a positive birefringence.

17. The method of claim 16, wherein the optical compensator is passive circuit layer and the passive circuit layer is fabricated to equivalent specifications of the active circuit layer.

18. The method of claim 13 further comprising disposing the optical compensator in close proximity to an outer surface of the active circuit layer.

19. The method of claim 13, wherein the optical compensator is integrated with a wide viewing angle film.

20. The microdisplay of claim 13, wherein the active circuit layer includes a CMOS circuit.

21. The microdisplay of claim 20, wherein the CMOS circuit includes a plurality of thin-film-transistors.

22. The microdisplay of claim 1, wherein the active circuit layer includes an array of pixel electrodes, having a pixel dimension of less than about 50 microns.

23. The microdisplay of claim 13, wherein the liquid crystal material is selected from the group comprising twisted-nematic liquid crystal material, single-domain tilted vertical alignment liquid crystal material, and multi-domain vertical alignment liquid crystal material.

24. The microdisplay of claim 13 wherein the optical birefringence value is less than 0.03 µm.

25. A microdisplay, comprising:
   means for displaying an image through an active circuit layer having an optical birefringence value that contributes to an asymmetrical viewing space;
   means for compensating for at least a portion of the optical birefringence of the active circuit layer, wherein the optical axis of the compensator is vertical with respect to the plane of the compensator, and wherein the means for compensating compensates an optical birefringence value of the active circuit layer in a range between about 0.02 µm and about 0.05 µm; and
   a layer including a liquid crystal material.

* * * * *